June 11, 1940.  A. BRENDLIN  2,203,859
HIGH PRESSURE MEMBRANE
Filed May 26, 1937
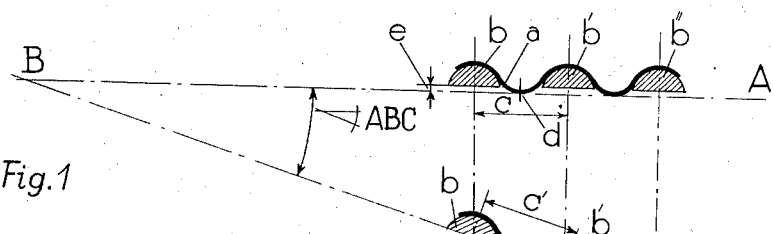
Fig. 1
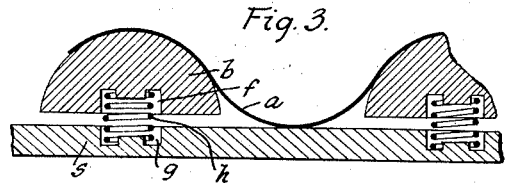
Fig. 3
Fig. 2
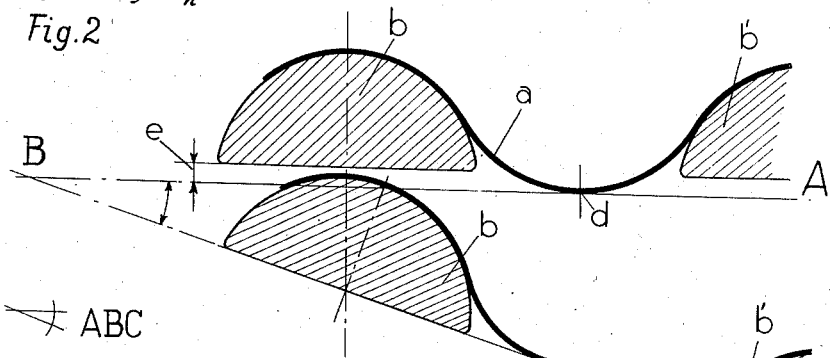
Fig. 4
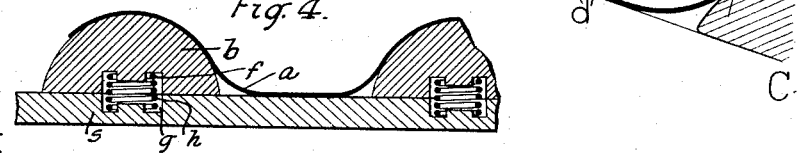
Fig. 5
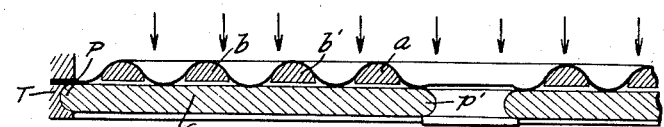
Fig. 6
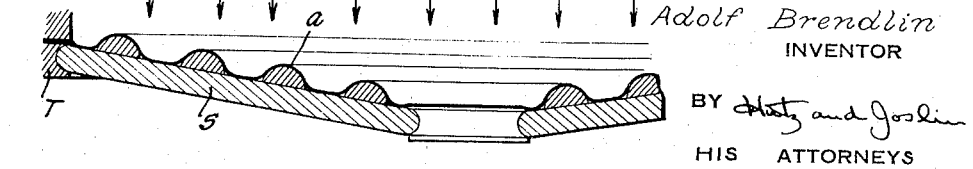
Adolf Brendlin
INVENTOR
BY Hatz and Joslin
HIS ATTORNEYS Patented June 11, 1940

2,203,859

UNITED STATES PATENT OFFICE 2,203,859

HIGH PRESSURE MEMBRANE

Adolf Brendlin, Knapsack, Bezirk Cologne, Germany

Application May 26, 1937, Serial No. 144,783
In Germany May 28, 1936

6 Claims. (Cl. 137—157)

The present invention relates to a high-pressure membrane adapted for a very long stroke, that is to say capable of much movement in a direction vertical to its general surface correspondingly with the direction of the pressure.

In order to increase the resistance of membranes in bellows pumps it has been proposed to support the membranes on the face subjected to lower pressure by plates or the like and to provide for a particularly long stroke by a movable arrangement of the supports and by an undulated form of the membrane. It has also been suggested in this connection to mount rings between the supporting plates and the membranes by which the wave crests of the membranes are supported whereas the wave troughs rest on the supporting plates.

I have found that deformation of supported undulated high-pressure membranes as for instance used in the aforesaid bellows pumps, or for similar purposes is avoided still more safely, while the strain on the membranes is reduced and their life is considerably increased, if when the membranes are relieved the supporting means situated between the supports and the wave crexsts of the membranes have a certain play relative to the supports, that is to say if when the membranes are charged the supporting means rest on the supports, while when the membranes are relieved the supporting means are not obliged to be in contact with the plates, but may loosely rest upon them. In this arrangement the wave crests are always carried, in the charged as well as in the relieved membranes, by the supporting means whereas the wave troughs rest on the supports, for instance plates, placed underneath.

The high-pressure membrane of the present invention, therefore, consists of an undulated membrane, essentially flat rigid supports placed underneath this membrane on the face subjected to the lower pressure and supporting means between the supports and the membrane on which means the wave crests of the membrane are carried, the said means resting on said supports when the membranes are charged but having a certain play relative to the membrane or to the support lying underneath them when the membranes are relieved. As supports there may be used plates or the like; the supports need not be quite flat but may be, for instance, slightly curved or corrugated. The supporting means interposed between the supports and the wave crests must correspond with the form of the latter. If the waves are for instance circular, elliptic or of a similar form, this being suitable in many cases, they are supported by corresponding rings whose circumference has the circular or other form of the wave and whose cross section is proportioned in such a manner that the rings fit in the hollow space between the wave crest and the support, for instance a plate, and do not entirely fill this hollow space, but leave a certain play between support and rings. The part of the rings facing the support (plate) is suitably flat so as to rest evenly on the support and at the same time to allow the wave ring a certain relative movement whereby the stroke of the whole device is increased.

Alternatively, the rings may be composed of several flat superimposed single rings; between the single rings there remain spaces which are, however, only present when the membranes are relieved; when charged, the rings are pressed together and against the support. For this purpose the rings are elastically mounted so that when the pressure on to the membrane is released, they may slightly raise the wave crests of the membrane and slightly remove themselves from the support. A slight lateral displacement of the waves and rings is connected with this pressing together, no matter whether these rings consist of one piece or of several superimposed rings. By this arrangement the membrane becomes more movable and admits of a longer stroke.

The entire membrane may have the form of a disk or may be annular or of any other form. The shape of the waves and of the supporting means situated below the wave crests depends on the form of the membrane. An annular, elliptic or similar shape of the membrane and a corresponding construction of the wave crests and the supporting means for the wave crests, is especially suitable for the construction of bellows membranes and bellows pumps wherein the bellows are composed of a number of annular membrane parts of this kind. In any case a high degree of movability of the entire arrangement is attained connected with a resistance to high pressure and furthermore, in each position, a complete relief of pressure on all parts of the membrane by the supporting means placed underneath. As the rather sensitive membrane is relieved of pressure in every way, bellows pumps of this kind are adapted to resist the highest pressure and there does not exist any danger of the membrane leaking.

The invention is diagrammatically illustrated by way of example in the accompanying drawing which represents a portion of a disk-shaped high-pressure membrane tightly clamped or guided at its circumference and corrugated at its center when under pressure.

Fig. 1 is a radial section through this disk, three concentric supporting rings placed one within the other being illustrated together with the membrane in both the relieved and the charged condition of the bellows to which the membrane belongs.

Fig. 2 is a similar view drawn to an enlarged scale.

Fig. 3 is a radial section of a portion of the diaphragm and supporting members in unloaded condition and showing a resilient mounting for the wave crest supporting rings.

Fig. 4 is a view of the same parts but in loaded condition.

Fig. 5 is a radial cross sectional view of the diaphragm and supports in unloaded condition.

Fig. 6 is a similar view in the loaded condition.

The general arrangement of the high pressure membrane in accordance with the present invention at the beginning and the end of the stroke is shown in Figs. 5 and 6 respectively. In the former the diaphragm $a$ is shown in unloaded condition suitably clamped or fastened at its periphery in members T. Supporting rings $b$, $b'$, etc., are provided for the wave crests and an inflexible supporting member S which is pivotally mounted at its ends in supports P is arranged opposite the flat sides of the supporting rings $b$. As shown in Fig. 5 the rings $b$ are separated from or have a certain play with respect to the supporting member S but in the loaded condition as shown in Fig. 6, the supporting rings rest evenly on the member S.

The undulated membrane $a$, with the supporting rings $b$, $b'$, $b''$, below the wave crests, rests on supporting plates, the smoothly polished surface of which is illustrated by the line A—B. The point B is on the circumference of the membrane where the membrane is clamped or held with freedom to move in a suitable guide. When pressure is applied the surface of the undulated membrane is bulged from A to C so that the angle ABC is formed at B between the original position of the supporting surface A—B and its new position.

When the membrane $a$ is relieved from pressure the supporting rings $b$, $b'$, and $b''$ have a certain play $e$ on the line A—B; in this case the wave crests of the membrane $a$ are raised. The wave troughs $d$ of the membrane $a$ rest, in the relieved state, on the supporting plates.

When the membrane $a$ is loaded by the pressure and moved for its stroke, for instance from A to C, the entire extension of the membrane (that is the diameter in the case of a disk) is enlarged or, in other words, the distance of the various supporting rings $b$, $b'$ from each other and from the point B becomes greater in the direction B—C than in the direction B—A, while the diameter of the supporting rings $b$, $b'$ remains, of course, unaltered. Now the space $e$ between the rings $b$, $b'$, $b''$ and their support according to the invention proves to be of advantage: By the pressure applied the rings are placed on their support A—C and thus liberate a larger part of the membrane in the wave troughs so that these parts of the membrane extend in the troughs ($d'$) and can thus follow the enlarged distance $b$, $b'$ and rest, while being nearly entirely extended, on the support B—C between the rings.

The differing distance between the rings $b$, $b'$ from each other are illustrated in the drawing in the unloaded state of the membrane by $c$ and in the loaded state by $c'$. Owing to their flat under-surface the rings $b$, $b'$ which suitably are elastically mounted in such a manner that they are lifted again from the support A—B when the pressure acting on the membrane ceases, may also slide on the support B—C, in the direction away from B, when pressure is applied and during the movement from A to C. A suitable resilient mounting which permits this movement of the supporting rings $b$ is illustrated in Figs. 3 and 4 wherein a recess $f$ is provided in the supporting ring $b$ and a similar recess $g$ is provided in the supporting plate S. A spiral or helical spring $h$ is arranged with its ends in the aforesaid recess. The spring $h$ lifts the supporting rings $b$ from the supporting plates S when the pressure on the diaphragm is relieved. When pressure is applied, however, the springs are compressed into the recess thereby permitting the flat side of the supporting rings to rest evenly on the supporting plates. Also, because of the flexibility of the spring member radial shifting of the supporting rings responsive to the application and relief of pressure on the diaphragms is possible. It will be understood that this showing of the resilient support is intended to be merely illustrative and that many other forms will readily occur to one skilled in this art.

If the rings $b$, $b'$ consist of several superimposed, flat single rings, the spaces between these single rings are parallel to the spaces between the rings $b$, $b'$, $b''$ and the support A—B illustrated in the drawing. When the rings $b$, $b'$ are subdivided into single rings of the kind described, these single rings may be connected with each other like a helix, an elastic support of the wave crests of the membrane being thus afforded.

I claim:

1. A high-pressure membrane which comprises an undulated membrane, rigid, essentially flat supports placed underneath this membrane on the face subjected to lower pressure on which supports the wave troughs of the membrane rest, and means on which the wave crests of the membrane are carried, said means corresponding with the form of the wave crests and resting in the loaded state of the membrane evenly on said supports, in the unloaded state, however, having a certain play relative to the supports in such a manner that when the membrane is charged a deformation of the membrane material is avoided.

2. A high-pressure membrane which comprises an undulated membrane, the waves of which are circular or of a similar form, rigid, essentially flat supports placed underneath this membrane on the face subjected to lower pressure, on which supports the wave troughs of the membrane rest, and rings corresponding with the form of the wave crests of the membrane and carrying these wave crests, said rings in the loaded state of the membrane resting evenly on said supports, in the unloaded state, however, having a certain play relative to the supports in such a manner that when the membrane is charged a deformation of the membrane material is avoided.

3. A high-pressure membrane which comprises an undulated membrane, the waves of which are circular or of a similar form, rigid, essentially flat supports placed underneath this membrane on the face subjected to lower pressure, on which supports the wave troughs of the membrane rest, and rings corresponding with the form of the wave crests of the membrane and carrying these wave crests, said rings in the loaded state of the membrane resting evenly on said supports, in the unloaded state, however, having a certain play relative to the supports in such a manner that when the membrane is charged a deformation of the membrane material is avoided, each of said rings being composed of several flat superimposed single rings.

4. A high-pressure membrane which comprises an undulated membrane, the waves of which are circular or of a similar form, rigid, essentially flat plates placed underneath this membrane on the face subjected to lower pressure, on which plates the wave troughs of the membrane rest, and elastically mounted rings corresponding with the form of the wave crests of the membrane and carrying these wave crests, said elastically mounted rings in the loaded state of the membrane resting evenly on said plates, in the unloaded state, however, having a certain play relative to the plates in such a manner that when the membrane is charged a deformation of the membrane material is avoided.

5. A high-pressure membrane which comprises an undulated membrane, the waves of which are circular or of a similar form, rigid, essentially flat plates placed underneath this membrane on the face subjected to lower pressure, on which plates the wave troughs of the membrane rest, and elastically mounted rings corresponding with the form of the wave crests of the membrane and carrying these wave crests, said elastically mounted rings in the loaded state of the membrane resting evenly on said plates, in the unloaded state, however, having a certain play relative to the plates in such a manner that when the membrane is charged a deformation of the membrane material is avoided, each of said elastically mounted rings being composed of several flat superimposed single rings.

6. An annular or disk-shaped high-pressure membrane which comprises an undulated membrane, the waves of which are circular or of a similar form, rigid, essentially flat plates placed underneath this membrane on the face subjected to lower pressure, on which plates the wave troughs of the membrane rest, and elastically mounted rings corresponding with the form of the wave crests of the membrane and carrying these wave crests, said elastically mounted rings in the loaded state of the membrane resting evently on said plates, in the unloaded state, however, having a certain play relative to the plates in such a manner that when the membrane is charged a deformation of the membrane material is avoided.

ADOLF BRENDLIN.